United States Patent
Newcomb

(10) Patent No.: US 6,830,351 B2
(45) Date of Patent: Dec. 14, 2004

(54) ELECTRONIC VIBRATION DAMPENING CENTRAL REARVIEW REINFORCING ASSEMBLY

(76) Inventor: Jonathan Force Newcomb, 66 Hazel Ave., Livingston, NJ (US) 07039

( * ) Notice: Subject to any disclaimer, the term of this patent is extended or adjusted under 35 U.S.C. 154(b) by 118 days.

(21) Appl. No.: 10/392,610

(22) Filed: Mar. 21, 2003

(65) Prior Publication Data

US 2004/0184169 A1 Sep. 23, 2004

(51) Int. Cl.[7] ............ G02B 7/182; B60R 1/04; H01L 41/053; H01L 41/08
(52) U.S. Cl. ............ 359/871; 359/872; 248/476; 248/479; 248/481; 310/318; 310/326; 310/329; 310/339; 310/345; 310/348
(58) Field of Search .............. 359/854, 871, 359/872, 881; 248/475.1, 476, 477, 478, 479, 481, 488; 310/318, 326, 329, 338, 339, 345, 348

(56) References Cited

U.S. PATENT DOCUMENTS

| | | | | |
|---|---|---|---|---|
| 2,214,639 A | * | 9/1940 | Lenta | 359/854 |
| 3,609,014 A | * | 9/1971 | Kurz, Jr. | 359/874 |
| 4,088,398 A | * | 5/1978 | Zoursel | 359/605 |
| 4,708,420 A | * | 11/1987 | Liddiard | 359/199 |
| 4,781,436 A | * | 11/1988 | Armbruster | 359/606 |
| 4,848,888 A | * | 7/1989 | Polzer | 359/872 |
| 5,266,873 A | * | 11/1993 | Arditi et al. | 318/483 |
| 6,278,377 B1 | * | 8/2001 | DeLine et al. | 340/815.4 |
| 6,698,905 B1 | * | 3/2004 | Whitehead | 359/872 |

\* cited by examiner

*Primary Examiner*—Ricky D. Shafer

(57) ABSTRACT

A reinforcing structure for an automobile's central rearview mirror which includes an electronic vibration-dampening device. The reinforcing structure includes Piezo electric elements attached to a support structure, a clamping mechanism to stabilize the reflective mirror element and electronics including LEDs to dissipate energy extracted from the mirror. The vibration-dampening features include Piezo electric crystals attached to a support structure to press against the central rearview mirror housing and a circuit card with various components to dissipate unwanted vibration. Also, the invention includes a spring loaded, pivoted clamping system to further stabilize the entire structure. The invention achieves dampening mainly through the application of an inertial dampening system that utilizes Piezo crystals and weights to adequately absorb excess vibration. The invention allows for compatibility between various styles of rearview mirrors as well as allowing for adjustment of the angle of the mirror through a detachable pivot which attaches the inertial dampening system connected to the support structure to a clamping base. The proposed invention can adequately dampen dangerous and unwanted vibration as well as provide an entertaining indication as to when vibrations are being suppressed electronically.

9 Claims, 12 Drawing Sheets

FIG 6
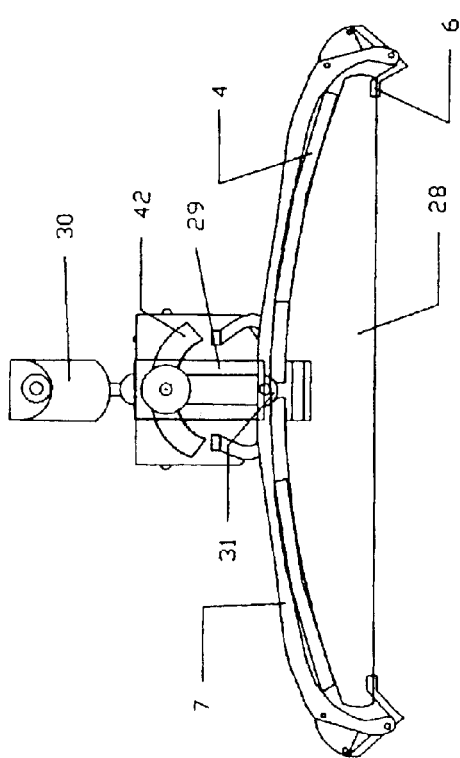
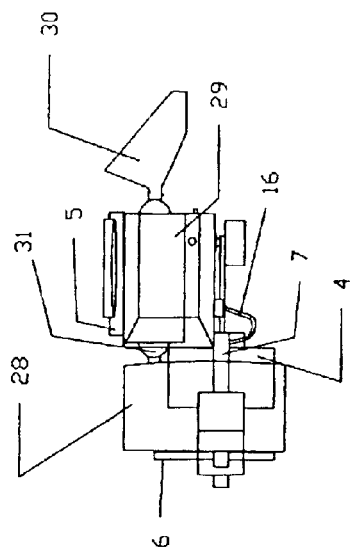
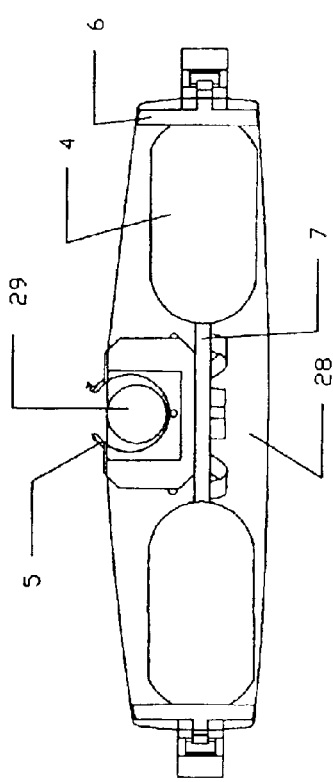

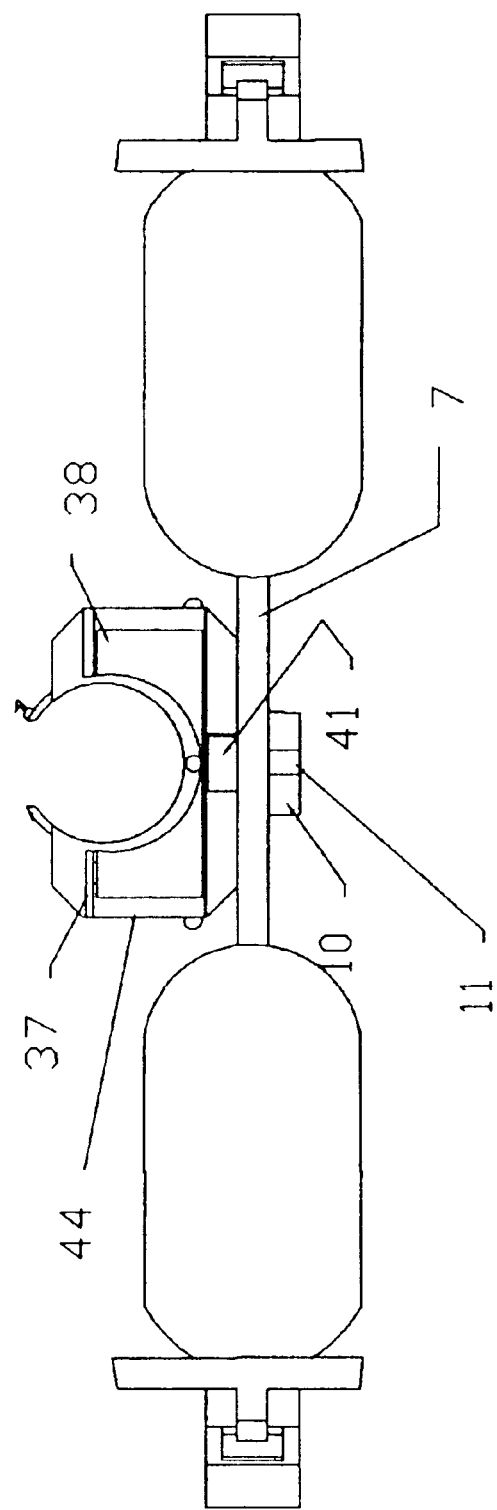

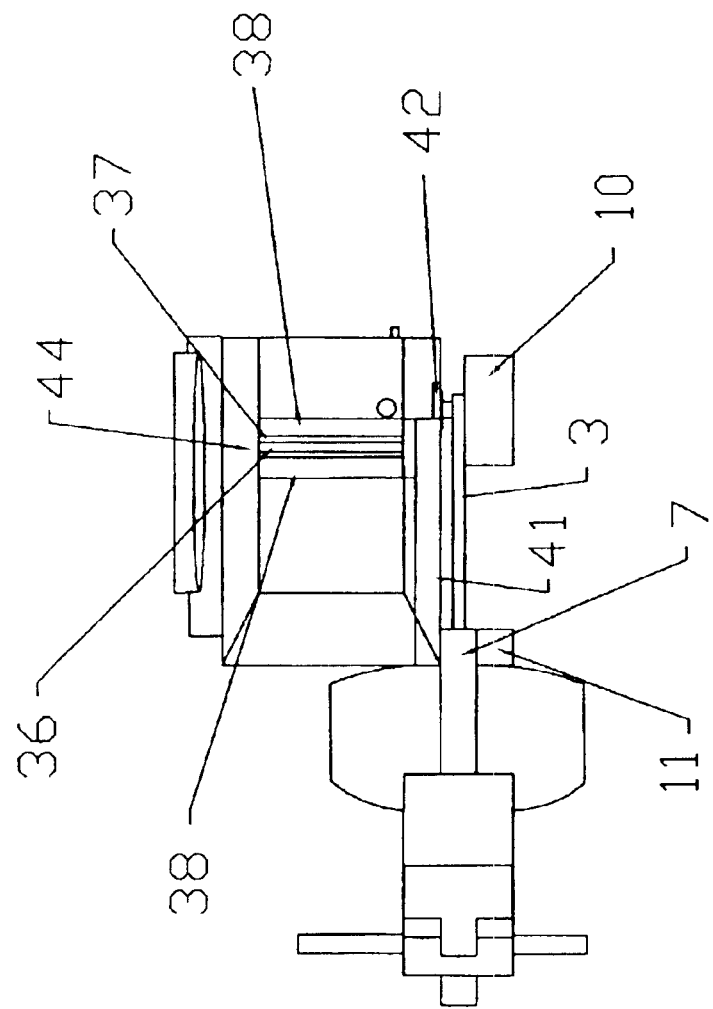

ELECTRONIC VIBRATION DAMPENING CENTRAL REARVIEW REINFORCING ASSEMBLY

FIELD OF THE INVENTION

This invention relates to rearview mirrors for vehicles and, more particularly, to a vehicular rearview mirror assembly, and especially an interior central rearview mirror assembly, including mechanical and electrical vibration dampeners/stabilizers which reduce the vibration of an adjustable mirror element as well as its housing.

BACKGROUND OF THE INVENTION

Rearview mirror assemblies used in motor vehicles, especially interior central rearview mirror assemblies secured to the interior windshield surface, include a manual angular adjustment means allowing movement of the reflective mirror element housing to various positions for viewing traffic and other conditions to the rear of the vehicle. Also, a bearing allows for a slight angular adjustment of the reflective element for nighttime driving. As a consequence of such adjustable mounting, various sources of vibration affect the visibility of images reflected by the mirror element causing both annoyance and a safety hazard. The mirror may also be stabilized because there is play between the mirror and the mirror bracket. Unwanted vibration results from a powered subwoofer creating compression waves that vibrate both the rearview mirror and the windshield upon which the rearview mirror is mounted.

The present invention provides dampening of unwanted vibration keeping the mirror in a stable state where vibrations would normally render the central rearview mirror useless. Also, the invention will allow for angular adjustment of the mirror. In addition, the invention will also add an attractive flicker of light due to the method of dissipation of the vibration energy.

SUMMARY OF THE INVENTION

The invention provides a vibration stabilized rearview mirror assembly for vehicles, and especially interior central rearview mirror support assemblies, in which dampeners and stabilizers are mounted against the pivotally adjustable reflective mirror housing assembly. The dampeners are designed so that they define the lower half of the mirror housing and incorporate clamps that stabilize the reflective mirror element. An inertial dampener is also mounted within the assembly to add to the dampening effect.

In one form, the invention is a vibration stabilized rearview mirror support assembly for vehicles including a clamping mechanism and housing structure containing the said clamping mechanism. This clamping mechanism is comprised of two halves of a tubular structure bound by an axle passing through one side of the tubular structures. To keep these structures firmly clamped, a clasp is mounted on one half of the tube and a receiver for the clasp is mounted on the other half. Suspended from the housing structure is a Piezo/clamp support member that is pivoted on a detachable pivot screw that protrudes into the Stabilized Piezo/clamp support member mount located on the underside of the housing structure. From this Piezo/clamp support member Piezo crystal assemblies are mounted to provide a surface to define the lower half of the mirror housing. Also, from the said Piezo/clamp support member, a spring loaded clamping mechanism is mounted to offer support of the mirror reflective element. Mounted within the said housing structure is a circuit card comprised of AC input connection, silicon bridge rectifiers a two-position switch, two LEDs and an output connection.

To further elaborate on said elements of the invention, the Piezo crystal assembly is comprised of a weight supporting a light pressure spring on the Piezo/clamp support member side of the crystal, Piezo crystals and a thin rubber coating containing the entire assembly. These Piezo crystals' resonate frequencies must be as close as possible to the known resonant frequency of the mirror housing. This is to allow for the greatest vibration dampening efficiency of the crystals. The spring loaded clamping mechanism is comprised of the end of the Piezo/clamp support member, a pivoted spring-loaded spacer containing a pivoted spring loaded pressure block, and a clamp that is made of a soft light conducting plastic. The light conducting clamp houses an LED with leads that run back to an output connection. The clamping assembly is pivoted on the end of the Piezo/clamp support member with a protruding clamp structure that acts as a $1^{st}$ class lever with the mirror clamp. The said spacer and spring loaded pressure block, when retracted, will provide positive pressure on the protruding clamp structure causing the light conducting plastic clamp to maintain pressure on the reflective element of the mirror. When extended, the pressure is relieved from the protruding clamp structure and in effect, from the reflective element of the mirror. This allows the invention to be attached or removed from the central rearview mirror quickly and easily.

The invention provides at least two methods of dampening which include inertial dampening and Piezo electric dampening. The said inertial dampening is achieved through an inertial dampener mounted within the housing structure. This dampener is comprised of a large Piezo crystal sandwiched between two flexible rubber sheets. The rubber sheets are mounted to the sides of the housing structure and support the mount for the Piezo/clamp support member. On the outside of the said rubber sheets are weights that are allowed to vibrate along with the rubber sheets and the Piezo crystal. In this configuration, the dampener will suppress many of the vibrations caused by the action of the windshield on the mirror structure. Also, a dampening effect occurs because mass is added to the mirror structure. This, in turn, translates into a higher inertia of the mirror assembly yielding less vibration. The purpose of having the inertial dampener support the Piezo/clamp support member is to allow for movement of the Piezo/clamp support member relative to the housing structure. This greatly improves the dampening efficiency of the invention. The invention also provides another mode of Piezo electric dampening where Piezo crystals are utilized again to convert some of the vibration energy from the rear of the mirror housing into electrical energy. The electrical energy from both the Piezo mount crystals and the inertial dampener crystal is then directed through silicon bridge rectifiers to filter the current and then to LEDs housed in both the mirror clamp as well as the housing structure. A two-position switch is provided to choose which LEDs are illuminated.

As will be understood from the various embodiments of the invention, the present vibration stabilized central rearview mirror support assembly for vehicles provides flexibility for the angular adjustment of the mirror housing if needed. The detachable Piezo/clamp support member pivot screw allows for left and right rotation of the Piezo/clamp support member. The Piezo/clamp support member pivot screw's center of rotation is directly inline with the mirror angle adjustment ball joint's center of rotation. This is to allow for mirror angle adjustment without expansion or contraction of the Piezo/clamp support member. Alignment of the pivots greatly simplifies the operation and construction of the invention. A friction lock is attached to the Piezo/clamp support member via the friction lock connector and extends to the friction track attached to the inertial dampener located at the rear underside of the housing structure to hold a given angle. The clamping housing allows for adjustment up or down of the mirror bracket at the mirror's rear ball joint. Also the invention allows for the interchange of clamping structures to accommodate different mirror mount brackets. The Piezo/clamp support member is detachable from the housing structure by removing the Piezo/clamp support member pivot screw and by unplugging the Piezo crystal input to the circuit card and the electrical output to the LEDs found in the mirror clamps. After this is accomplished, the Piezo/clamp support member can be reattached to a housing structure compatible with a given mirror mount bracket. This allows the invention to be used on many styles of central rearview mirror bracket systems.

These and other objects, advantages, purposes and features of the invention will become more apparent from a study of the following description taken in conjunction with the drawings.

BRIEF DESCRIPTION OF THE DRAWINGS

FIG. 6 is an orthographic view of the mirror support assembly illustrating the attachment of the invention to the central rearview mirror.

FIG. 11 is a front view of the invention displaying the inertial dampener.

FIG. 12 is a right side view of the invention displaying the inertial dampener.

DESCRIPTION OF THE PREFERRED EMBODIMENTS

Figure 1:
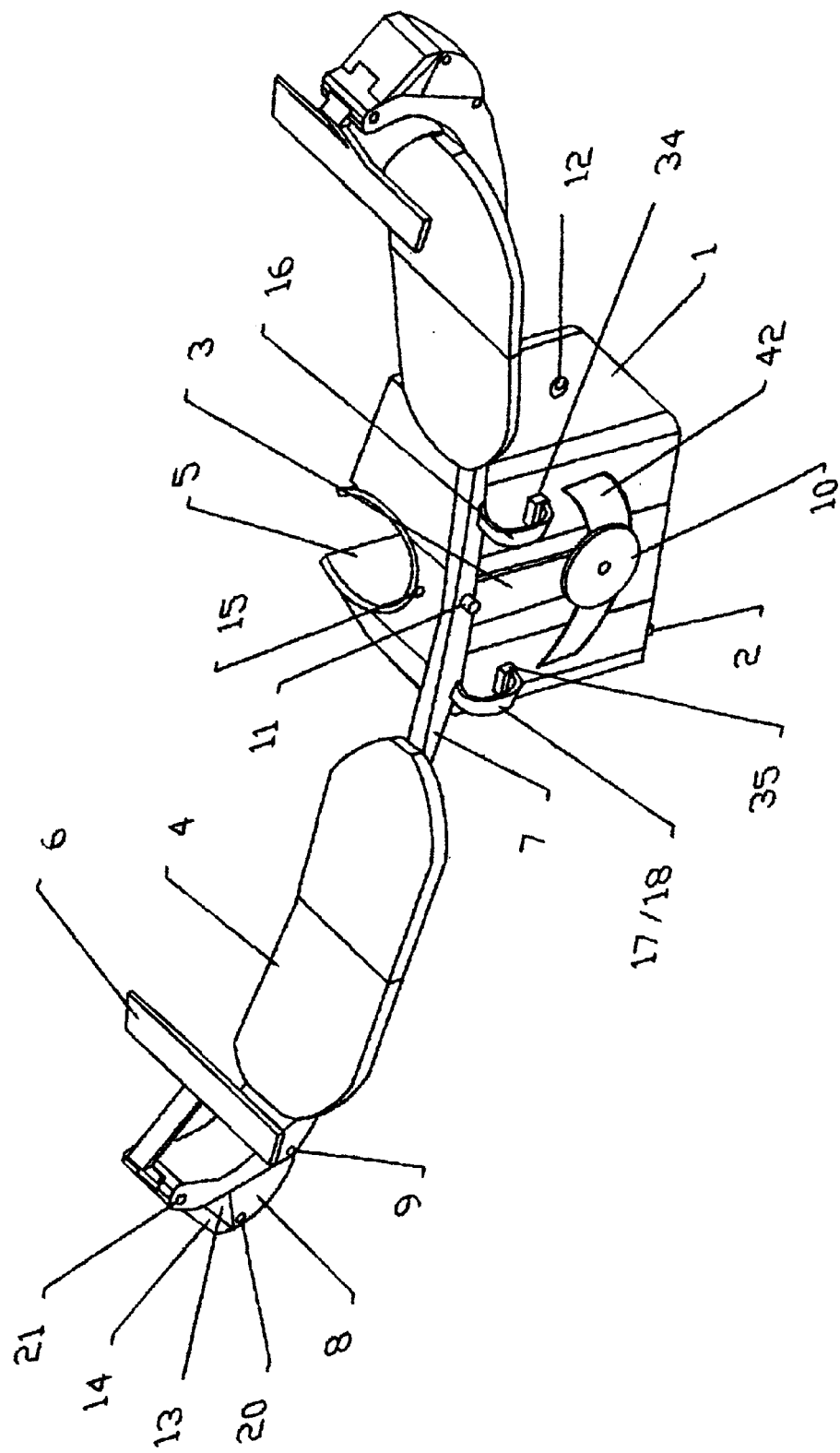
FIG. 1 is a perspective view of a first embodiment of the vibration stabilized rearview mirror support assembly for vehicles.
Figure 2:
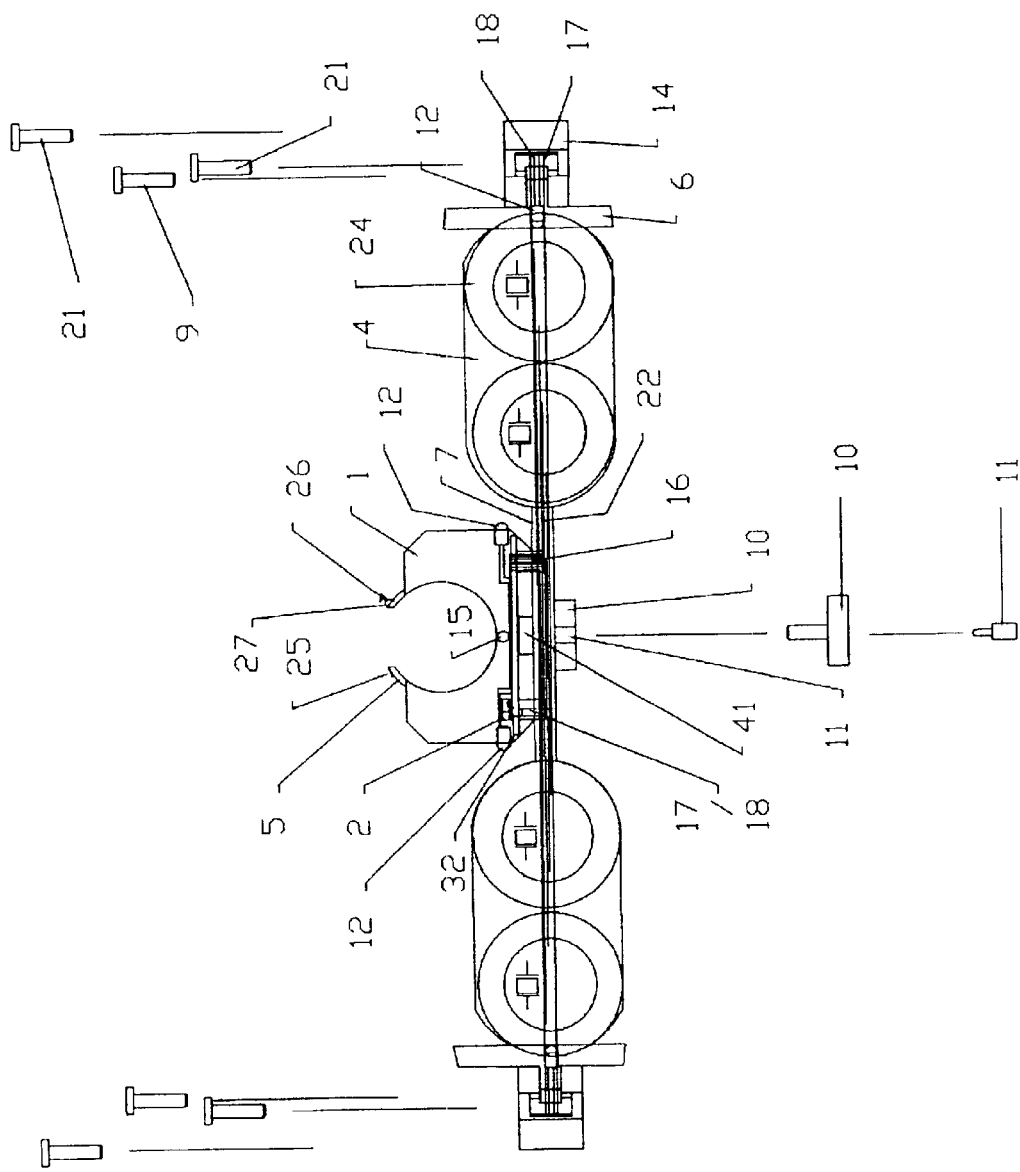
FIG. 2 is a front view of the mirror support assembly of FIG. 1 with the underlying electronic layer of the assembly shown.
Figure 3:
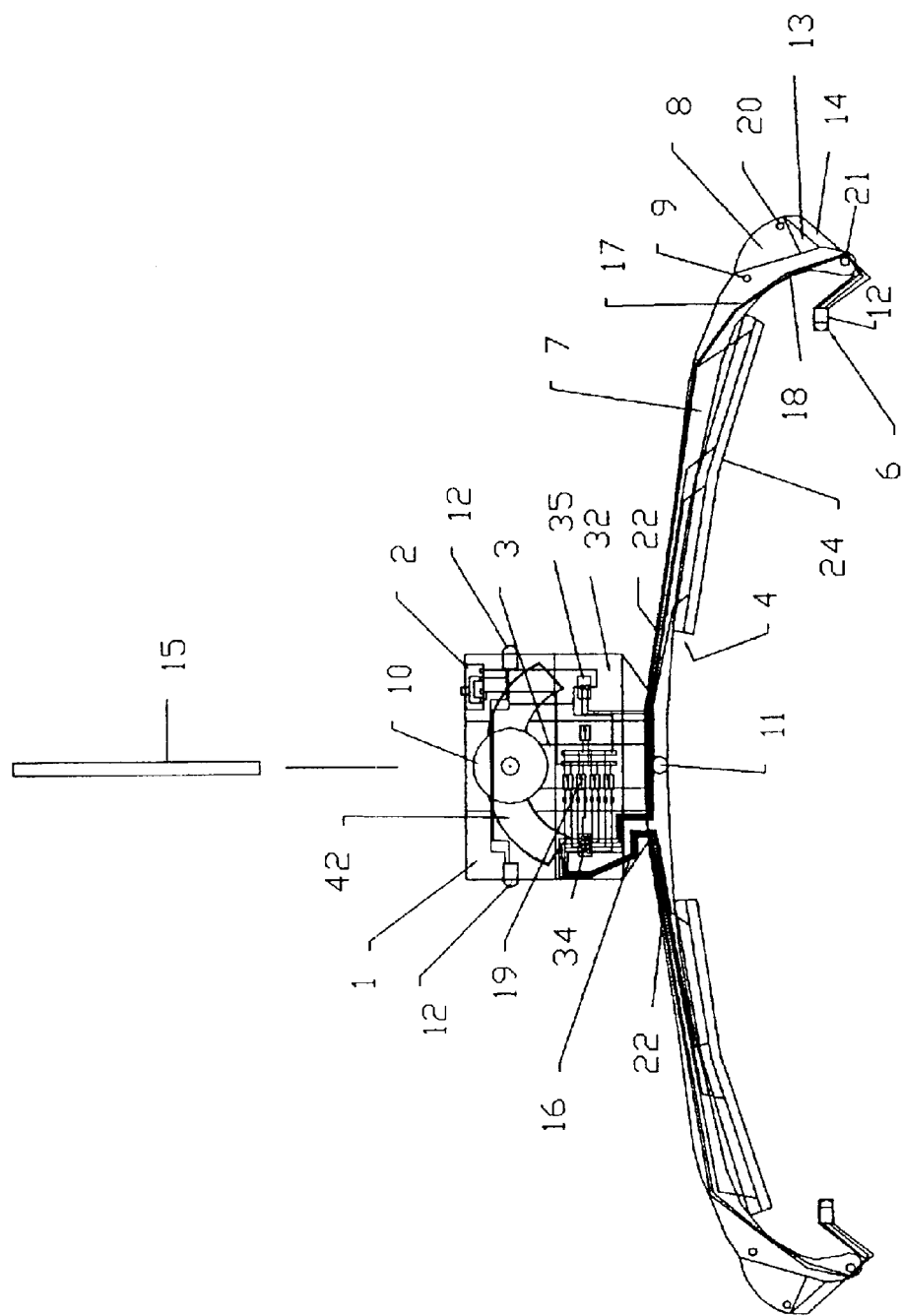
FIG. 3 is a plan view of the mirror support assembly again illustrating the electronics layer.

Referring now to the drawings in greater detail, FIGS. 1, 2, 6, 10, 11, 12 illustrate a first embodiment of a vibration stabilized interior central rearview mirror assembly for motor vehicles incorporating the present invention. The housing structure 1, which serves as a first mounting platform, contains the mirror bracket clamp 5, which is comprised of two halves of a cylinder cut lengthwise bound by the mirror bracket clamp pivot 15 (see FIG. 2). Mounted atop one side of the mirror bracket clamp 5 is the mirror bracket clamp lock clasp latch 26 hinged on the mirror bracket clamp lock clasp hinge 27. On the other half of the mirror bracket clamp 5 is the mirror bracket clamp lock clasp receiver 25. When the invention is in place, the mirror bracket clamp 5 squeezes against the mirror mount bracket 29 (see FIG. 6). This is the primary method of suspension of the invention from the central rearview mirror. Mounted to the inner sides of the housing structure is the inertial Piezo dampener 44 comprised of a large inertial Piezo crystal 36, flexible rubber support strips 37, inertial weights 38, mounting blocks 39, Stabilized Piezo/clamp support member mount 41 and the stabilized friction track 42 (see FIG. 10). The Stabilized Piezo/clamp support member mount 41 is suspended from the inertial Piezo dampener 44 to provide a vibration-dampening mount for the Piezo/clamp support member 7, which serves as a secondary mounting platform, (see FIG. 12). Suspended from the stabilized Piezo/clamp support member mount 41 is the Piezo/clamp support member 7 by the Piezo/clamp support member pivot screw 11, which serves as a detachable pivot. Supported by the Piezo/clamp support member 7 is the friction lock connector 3 that is used to thread the screw of the friction lock 10 to the stabilized friction track 42 (see FIG. 1). Supported on the Piezo/clamp support member 7 is the Piezo crystal housing 4, which makes direct contact with the back of the central rearview mirror's housing to absorb vibrations (see FIG. 6).

Figure 7:
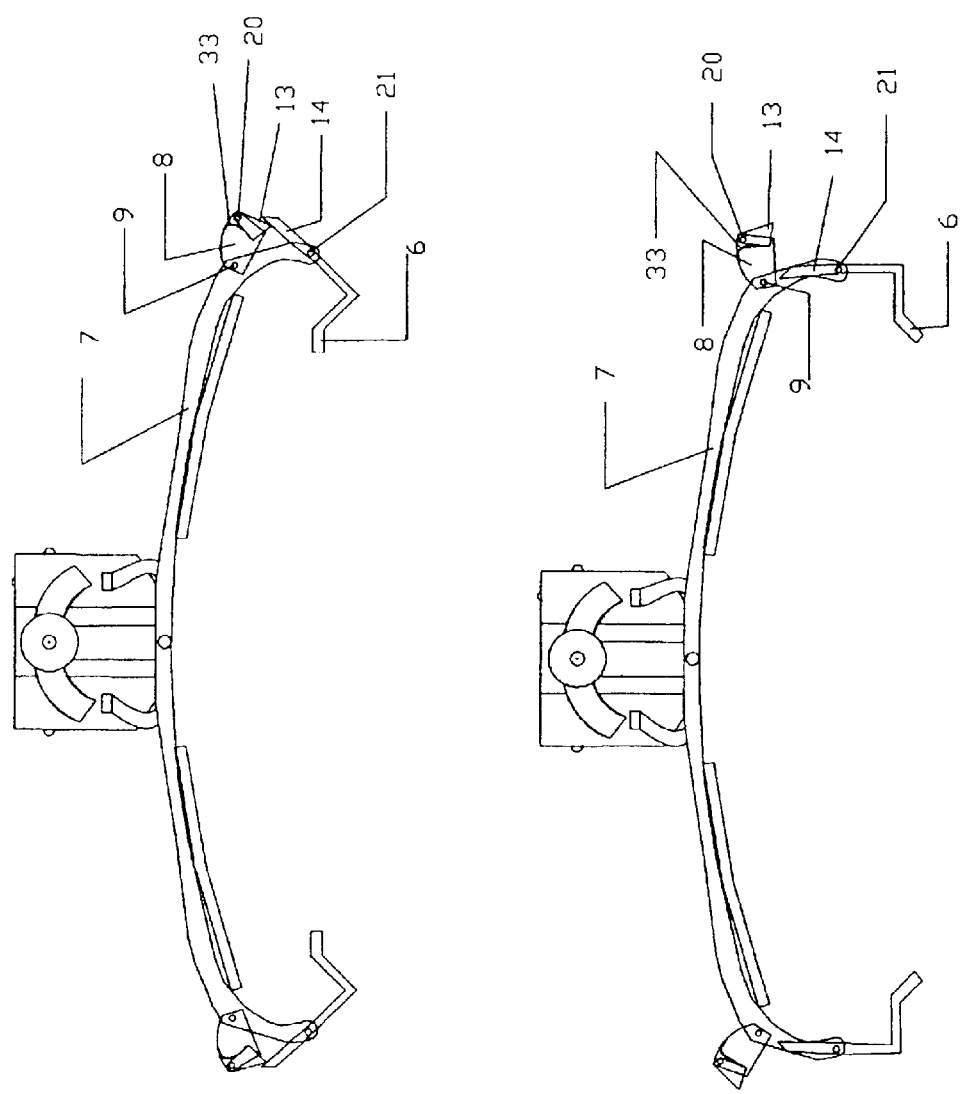
FIG. 7 is a top view of the mirror support assembly illustrating the movement of the light conducting mirror clamp and the spring-loaded spacer displaying the clamp release mechanism of the invention.

As best seen in FIGS. 1, 2, 4 and 7 the quick release mirror clamping mechanism is mounted on both ends of the Piezo/clamp support member 7 (see FIG. 7). The light conducting plastic mirror clamp 6 is pivoted at the very end of Piezo/clamp support member 7 suspended by the pivot for mirror clamp 21. The protruding end of the mirror clamp 14 when in the retracted position rests against the spring loaded pressure block 13 to maintain positive pressure on the mirror clamp against the mirror when installed. Within the spring loaded pressure block 13 is a tension spring 33 to maintain pressure against the spring loaded pressure block 13. Supporting the spring-loaded pressure block 13 is the pivot for spring loaded pressure block 20, which is attached to the spring-loaded spacer 8, which serves as a sleeve. The Spacer pivot screw 9 penetrates the Piezo/clamp support member 7 as well as the spring-loaded spacer 8 acting as a hinge. To release the clamps from the reflective element of the mirror the user would rotate the spring loaded spacer 8 outward causing the pressure to be relieved from the protruding clamping structure 14. This will allow the mirror clamps 6 to rotate outward and thus partially providing means for removal of the invention from the central rearview mirror.

Figure 4:
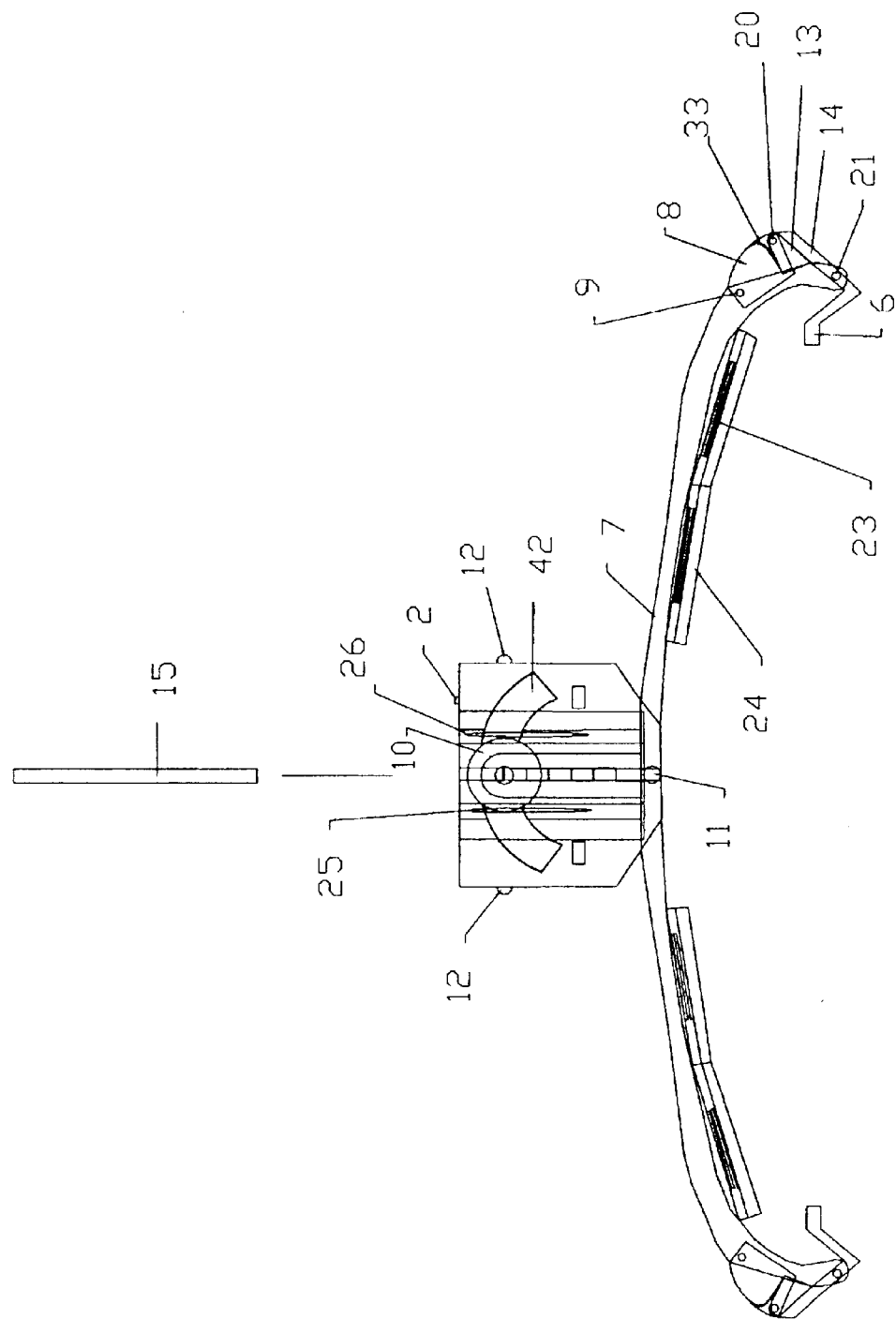
FIG. 4 is a plan view of the mirror support assembly illustrating all hidden components found beneath the surface of the invention that are not electronic.
Figure 5:
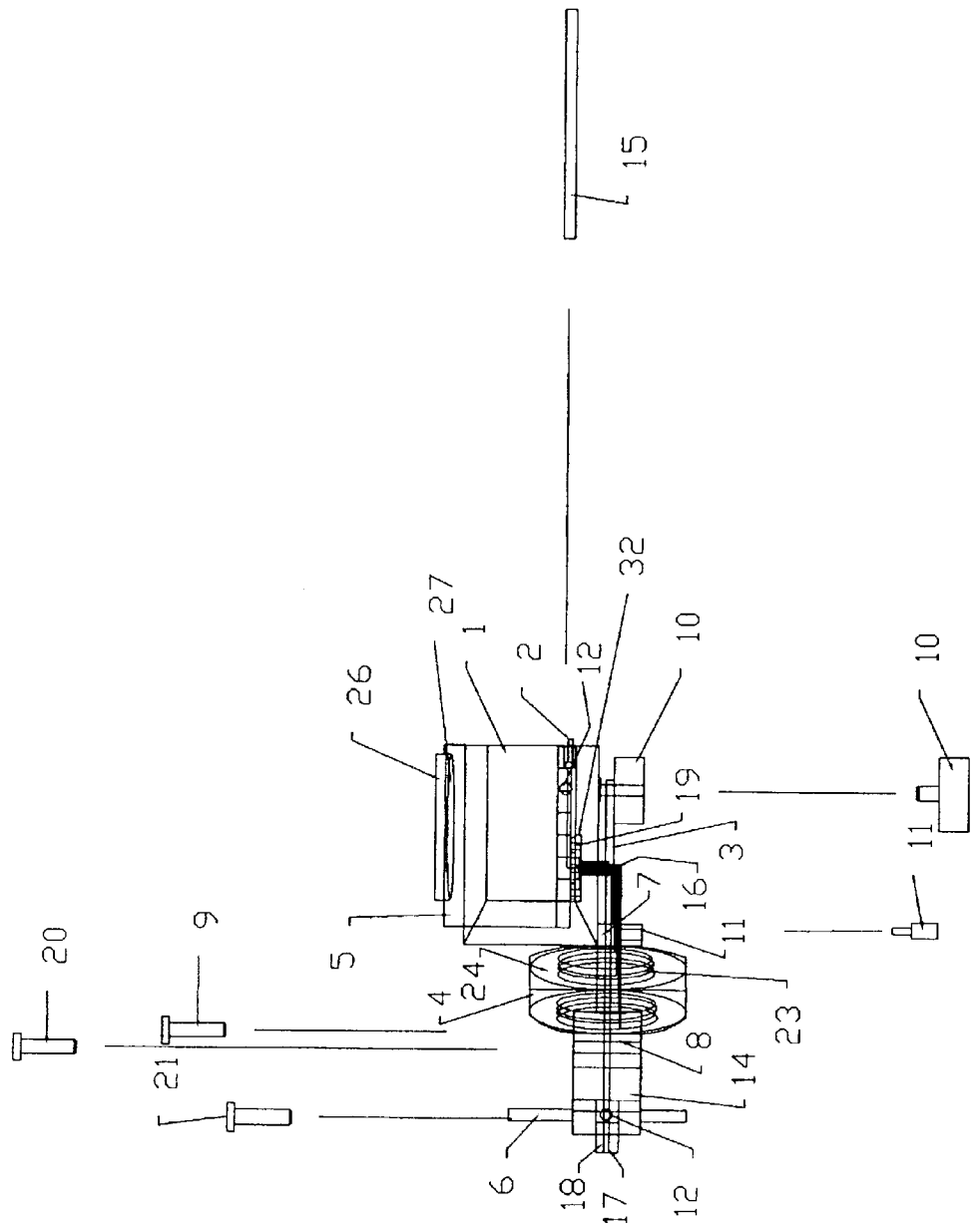
FIG. 5 is a right side view of the mirror support assembly illustrating both hidden mechanical components and electrical components.

As best seen in FIGS. 2, 3, 4, 5, 6 and 10, the Piezo crystal housing 4 is constructed of a thin rubber material to protect the Piezo crystals 24 (see FIG. 2) and support arm inertial weights 43 (see FIG. 10) and the light backpressure springs 23 (see FIG. 4). These light backpressure springs 23 maintain constant pressure on the back of the Piezo crystals 24 (see FIG. 5) so that they always make contact with the central rearview mirror housing 28 during vibration cycles (see FIG. 6). The support arm inertial weights 43 provide inertial dampening to further absorb vibrations as well as cause the Piezo crystals 24 to cycle when they undergo vibration (see FIG. 10). The AC Piezo output to circuit card 22 runs between the Piezo crystals 24 and the AC input from Piezo crystals eight-pin connector 34 (see FIG. 3). This transmits the electrical energy converted from vibration energy to the circuit card 32 where it can be filtered and dissipated.

As best seen in FIGS. 2, 3, 5, and 10, the circuit card 32 is housed within the housing structure 1. Soldered to the circuit card are silicon bridge rectifiers 19 (see FIG. 3). These silicon bridge rectifiers 19 act to filter the incoming AC signal from the Piezo crystals 24 (Piezo/clamp support member) and inertial Piezo dampener 44 to a DC signal that may be used by the LEDs 12 (see FIG. 10). This in effect dissipates more of the electrical energy away from the crystals 24/36 yielding a slightly better dampening efficiency of the crystals 24/36. Also attached to the housing structure 1 is a two position switch 2 wired so that in one position, LEDs on the housing structure 1 illuminate to dissipate energy and in the other position, current is directed to the output connector 35 where the current will flow through the both the positive output connection from circuit card 17 and the negative output connection from circuit card 18 to the LEDs housed within the light conducting plastic mirror clamps 6 (see FIG. 3). This function is to allow for the user to switch which LEDs are dissipating energy in case the LEDs flickering in the light conducting plastic mirror clamp 6 becomes distracting.

Figure 9:
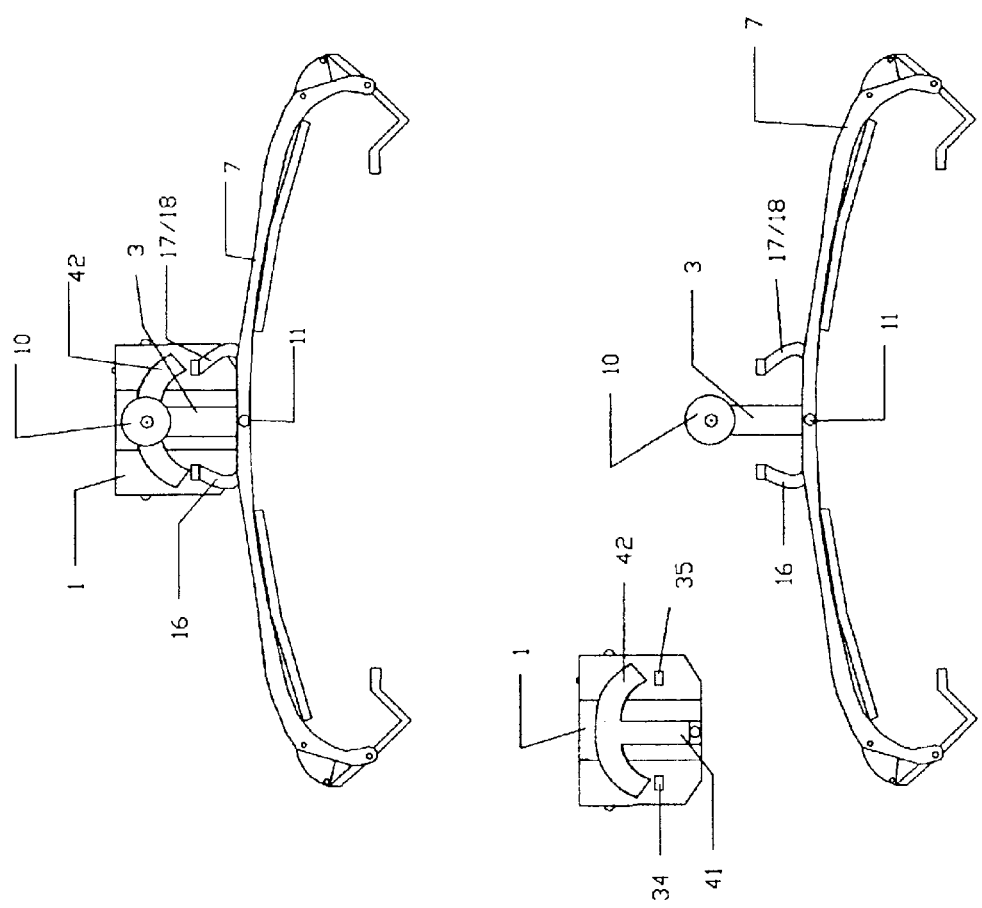
FIG. 9 is a top view of the mirror support assembly illustrating detachment of the Piezo/clamp support member from the housing structure.
Figure 10:
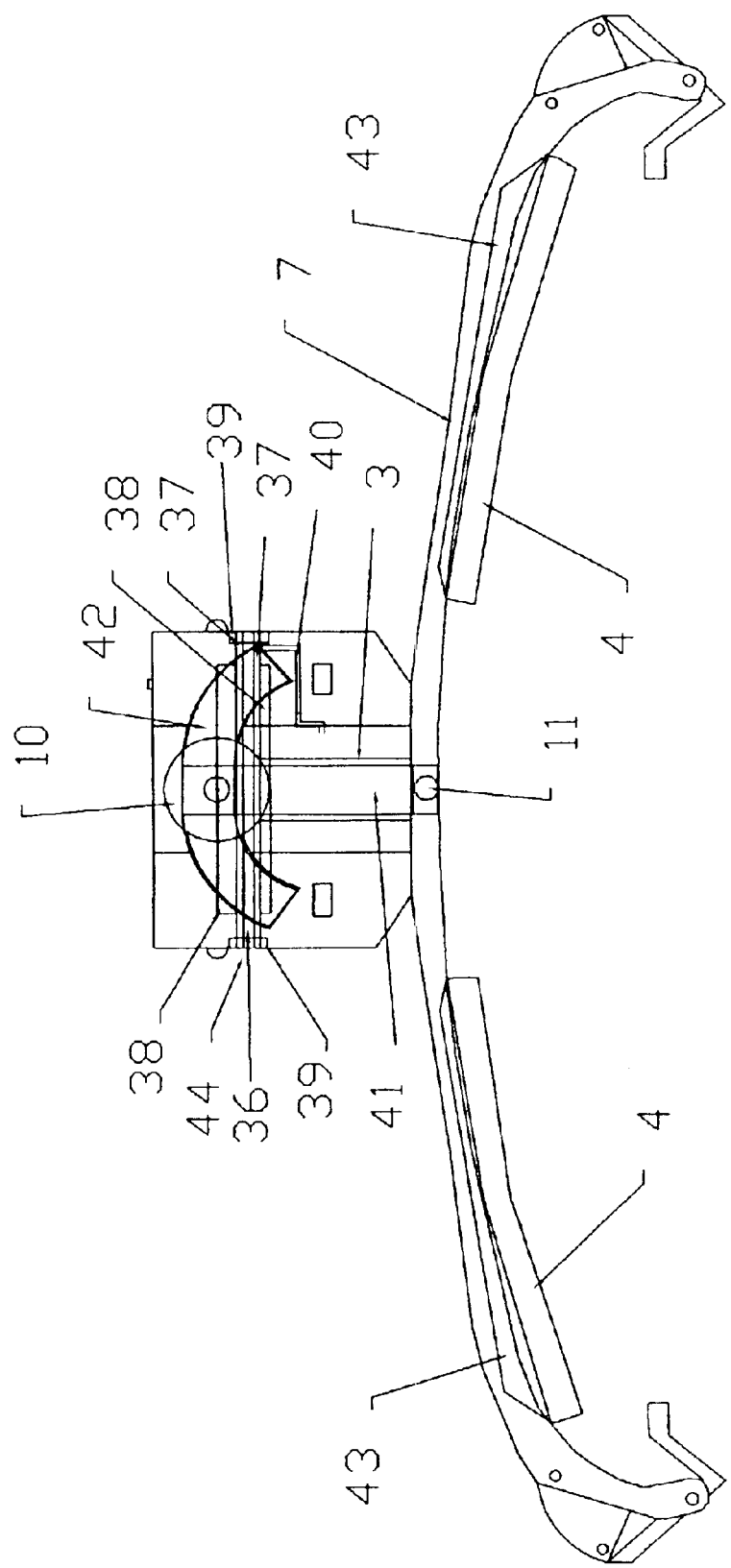
FIG. 10 is a top view of the invention displaying an inertial dampener housed within the housing structure to provide dampening of vibrations caused by movement of the windshield of the vehicle of which the central rearview mirror is mounted.

As best seen in FIG. 9, Detachment of the Piezo/clamp support member 7 from the housing structure 1 is accomplished by detaching the AC input from Piezo crystals eight pin connector 34 from the AC input from Piezo crystals 16 as well as disconnecting the output connector 35 from the positive output connection from circuit card 17/negative output connection from circuit card 18. Then by unscrewing the Piezo/clamp support member pivot screw 11 the user will detach the Piezo/clamp support member 7 from the Stabilized Piezo/clamp support member mount 41. This allows the Piezo/clamp support member 7 to be attached to other housing structures designed to be compatible with other types of mirror mount brackets.

Figure 8:
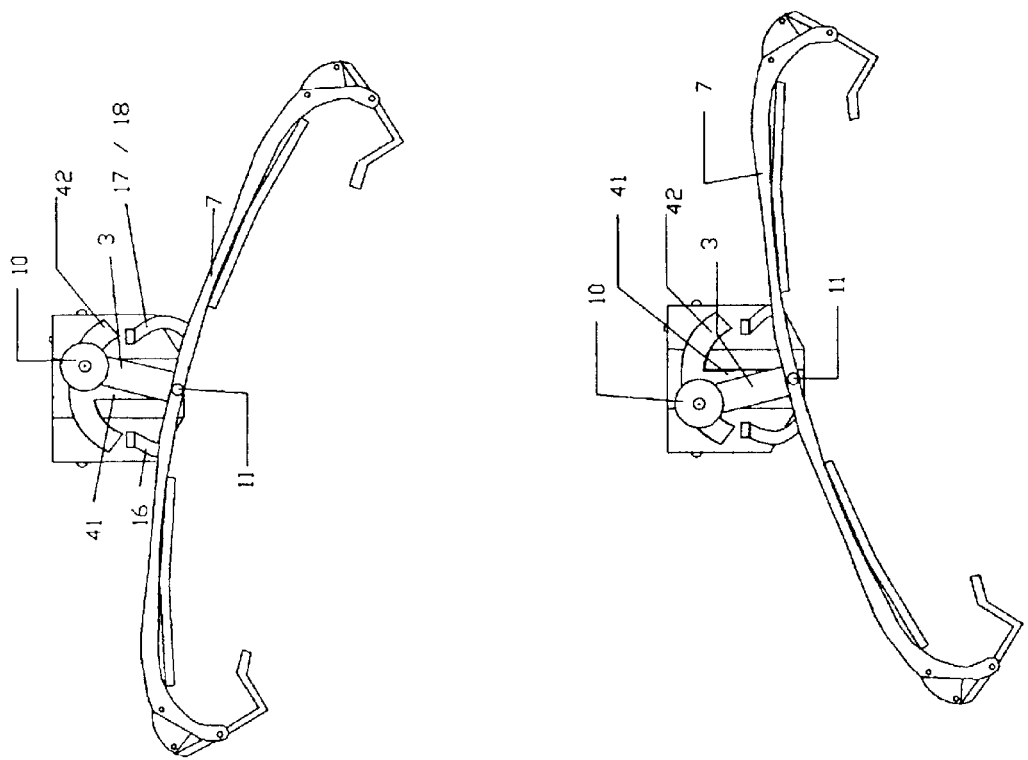
FIG. 8 is a top view of the mirror support assembly illustrating the Piezo/clamp support member's movements.

As best seen in FIG. 8, angular adjustment of the mirror is achieved by loosening the friction lock 10 and adjusting the mirror to a desired angle. Once this is achieved the user may tighten the friction lock 10 holding the mirror angle at a constant setting.

As best seen in FIGS. 6 and 12, the invention's mirror bracket clamp 5 attaches to the mirror mount bracket 29 (see FIG. 6). Also, the invention is held onto the central rearview mirror 28 with the light conducting plastic mirror clamps 6. The mirror housing 28 rests against the Piezo crystal housing 4 so that it can convert some of the mirror's vibration energy to electrical energy. The Inertial Piezo dampener 44 housed within the housing structure 1 dampens most of the remaining vibration (see FIG. 12).

While several forms of the invention have been shown and described, other forms will now be apparent to those skilled in the art. Therefore, it will be understood that the embodiments of the invention shown in the drawings and described above are merely for illustrative purposes and are not intended to limit the scope of the invention which is defined by the claims which follow.

Part Key:
1. Housing structure
2. LED selector switch
3. Friction lock connector
4. Piezo crystal housing
5. Mirror bracket clamp
6. Light conducting plastic mirror clamp
7. Piezo/clamp support member
8. Spring loaded spacer
9. Spacer pivot screw
10. Friction lock
11. Piezo/clamp support member pivot screw
12. LED
13. Spring loaded pressure block
14. Protruding clamping structure
15. Mirror bracket clamp pivot
16. AC input from Piezo crystals
17. Positive output connection from circuit card to LEDs
18. Negative output connection from circuit card to LEDs
19. Silicon bridge rectifier
20. Pivot for spring loaded pressure block
21. Pivot for mirror clamp
22. AC Piezo output to circuit card
23. Light backpressure spring
24. Piezo crystal
25. Mirror bracket clamp lock clasp receiver
26. Mirror bracket clamp lock clasp latch
27. Mirror bracket clamp lock clasp hinge
28. Central rearview mirror
29. Mirror mount bracket
30. Mirror mounting block
31. Mirror angle adjustment ball joint
32. Circuit card
33. Tension spring
34. AC input from Piezo crystals eight-pin connector
35. Output connector
36. Inertial Piezo crystal
37. Flexible rubber support strips
38. Inertial weight
39. Mounting block
40. Output from inertial Piezo crystal
41. Stabilized Piezo/clamp support member mount
42. Stabilized friction track
43. Support arm inertial weight
44. Inertial Piezo dampener

I claim:

1. An apparatus for damping vibrations in a central rearview mirror assembly of a vehicle comprising:

a first mounting platform with a defined interior space; said first mounting platform including an indentation and support apparatus suitable for the insertion of a central rearview mirror bracket;

an inertial damper comprised of a piezo crystal mounted within a housing structure sandwiched between flexible rubber supports with weights mounted on the outside of said rubber supports, such mounting allowing the inertial damper to vibrate independently of the housing structure;

a detachable pivot attached to said inertial damper;

a secondary mounting platform suspended on said detachable pivot;

a piezo electric vibration damping device attached to said secondary mounting platform, wherein said secondary mounting platform is in the form of a support arm to match the shape of a central rearview mirror housing backing; said piezo electric vibration damping device being attached inside said secondary mounting platform, wherein said piezo electric vibration-damping device consists of piezo crystals with electrical outputs; said secondary mounting platform including mirror clamps, with protruding arms, at their extremities; said mirror clamps having a spring-loaded sleeve pushing against the clamp's protruding arms; and wherein said first mounting platform includes a circuit card supporting a detachable input connection, silicon bridge rectifiers, a two-position switch, light emitting diodes, and a detachable DC output connection.

2. The apparatus according to claim 1, wherein said first mounting platform is a support structure, and said secondary mounting platform is a pivoted support arm.

3. The apparatus according to claim 1, wherein said inertial damper supports a mount for said secondary mounting platform.

4. The apparatus according to claim 1, wherein said piezo crystals are attached to said secondary mounting platform, and the piezo crystals are backed by relief springs mounted on weights that comprise part of said secondary mounting platform.

5. The apparatus according to claim 1, wherein said mirror clamps are mounted on pivots at the extremities of said secondary mounting platform to bridge around the perimeter of a mirror support housing to make direct contact with a reflective rearview mirror element; and said mirror clamps each include a protruding arm to extend through the pivot in effect creating a lever; and wherein said mirror clamps include a tension spring mounted within a pivoted structure mounted behind the mirror clamp's protruding arm pushing against said protruding arm to maintain pressure against the mirror clamp's protruding arm; and wherein said pivoted structure allows for pivoting to alleviate pressure against said mirror clamp's protruding arm, in effect removing the clamp's pressure from the mirror element.

6. The apparatus according to claim 1, wherein said detachable pivot of said secondary mounting platform allows for rotation of said secondary mounting platform relative to said first mounting platform; and wherein said pivot is detachable to allow for detachment of the secondary mounting platform from the first mounting platform.

7. The apparatus according to claim 1, wherein said secondary mounting platform includes an extension that threads a screw that protrudes to a flat plate supported by said inertial dampener creating a friction lock.

8. The apparatus according to claim 1, wherein said indentation of said first mounting platform allows for a mirror bracket clamp and wherein said indentation includes two halves of a tubular structure cut lengthwise are bound together at one end by a hinge to form a clamp; and a clasp is mounted atop one half of the said tubular structure; and mounted atop the other said half is a receiver for the clasp to allow for clamping of said tubular structure around said rearview mirror bracket.

9. The apparatus according to claim 1, wherein said apparatus further include light emitting diodes housed in said mirror clamps; and wherein said apparatus is wired in such a manner that in one position light emitting diodes housed in said mirror clamps illuminate and in another position, light emitting diodes in the housing structure illuminate to dissipate electrical energy converted from extracted vibration energy from said rearview mirror assembly; and said piezo crystals feed into said detachable input while said detachable DC output connects the light emitting diodes housed in said mirror clamps to the circuit card; and the detachable connections allow for detachment of electrical connections while detaching the secondary mounting platform from the first mounting platform.

* * * * *